United States Patent Office 2,868,701
Patented Jan. 13, 1959

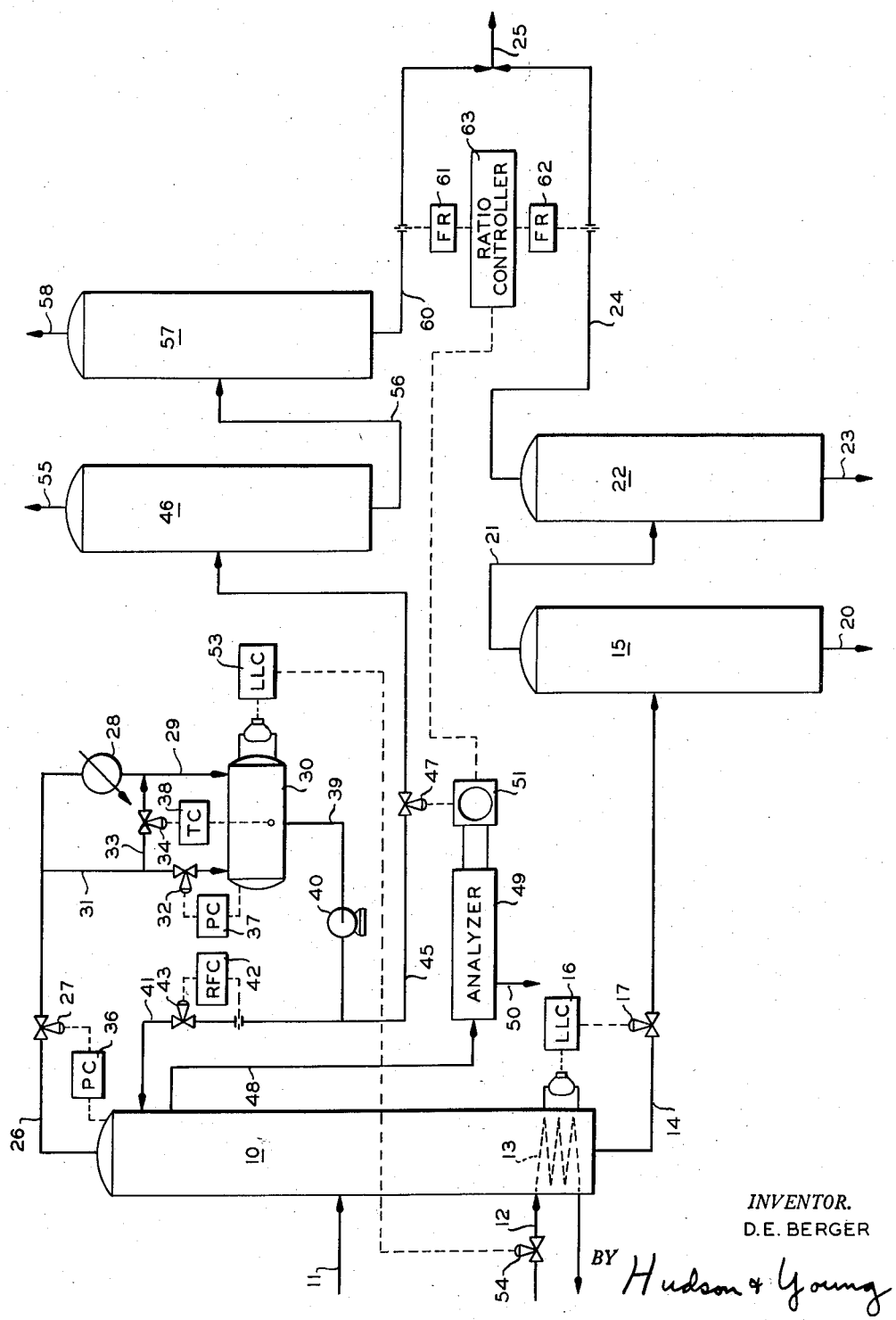

2,868,701

FLUID SEPARATION CONTROL

Donald E. Berger, Bartlesville, Okla., assignor to Phillips Petroleum Company, a corporation of Delaware Application April 2, 1956, Serial No. 575,396

14 Claims. (Cl. 202—160)

This invention relates to control systems for the separation of fluid streams by fractionation.

In petroleum refining operations, it is often desirable to recover intermediately boiling constituents from a fluid mixture. One particular example of such a process occurs in the separation of cyclohexane from a natural gasoline stream containing additional hydrocarbons having boiling points above and below the boiling point of cyclohexane. This separation can advantageously be accomplished by initially separating the feed stream into overhead and kettle product streams in a fractionation column. The initial separation is controlled so that a portion of the cyclohexane is removed in the overhead stream and a portion of the cyclohexane is removed in the kettle stream. The overhead stream is fractionated one or more times to provide a final product stream which is rich in cyclohexane. The kettle product stream is fractionated one or more times to provide a second final product stream which is also rich in cyclohexane. The two cyclohexane-rich streams are then combined.

In separations of this type, the capacities of the available fractionation columns often dictate the most economical separation procedure. The present invention provides a control system for a separation of this type whereby the initial separation is adjusted to maintain optimum overall operating conditions. The flow rates of the two final streams are measured and compared. A signal representative of this comparison controls the initial separation to regulate the relative volumes of the overhead and kettle streams to improve the efficiency of the overall fractionation process.

Accordingly, it is an object of this invention to provide improved apparatus for separating fluid streams.

Another object is to provide a control system for systems employed to remove intermediately boiling constituents from a fluid mixture.

Other objects, advantages and features should become apparent from the following detailed description, taken in conjunction with the accompanying drawing which is a schematic representation of the fractionation control system of this invention.

Referring now to the drawing in detail, there is shown a fractionation column 10 having an inlet conduit 11 communicating therewith to supply a fluid mixture to be separated. Heat is supplied to the lower region of column 10 by a steam line 12 which communicates with a coil 13. A kettle product is withdrawn from column 10 by means of a conduit 14 which communicates with a second fractionation column 15. The rate of kettle withdrawal through conduit 14 is adjusted by a liquid level controller 16 which regulates a valve 17 in conduit 14. A second kettle product is removed from column 15 through a conduit 20. An overhead product is removed from column 15 through a conduit 21 which communicates with a third fractionation column 22. A third kettle product is removed from column 22 by a conduit 23. A second overhead product is removed from column 22 through a conduit 24 which communicates with an outlet conduit 25.

A conduit 26, having a valve 27 therein, communicates between the top of column 10 and the inlet of a condenser 28. A conduit 29 communicates between the outlet of condenser 28 and a reflux accumulator 30. A by-pass conduit 31, having a valve 32 therein, communicates between conduit 26, downstream from valve 27, and accumulator 30. A second by-pass conduit 33, having a valve 34 therein, communicates between conduit 26, downstream from valve 27, and accumulator 30. Valve 27 is adjusted by a pressure controller 36 which is responsive to the pressure in the upper region of column 10. Valve 32 is adjusted by a pressure controller 37 which is responsive to the pressure in accumulator 30. Valve 34 is adjusted by a temperature controller 38 which is responsive to the temperature in accumulator 30. A drain conduit 39 communicates between accumulator 30 and the inlet of a pump 40. A reflux conduit 41 communicates between the outlet of pump 40 and the upper region of column 10. The flow through conduit 41 is maintained at a constant rate by a rate of flow controller 42 which adjusts a valve 43. An overhead product is withdrawn through a conduit 45 which communicates between the outlet of pump 40 and a fourth fractionation column 46. Conduit 45 has a control valve 47 therein.

A fluid sample is withdrawn continuously from the upper region of column 10 through a conduit 48 which communicates with the inlet of an analyzer 49. This sample stream is vented from analyzer 49 through a conduit 50. Analyzer 49 is adapted to provide a signal which is representative of the composition of the sample stream. In some applications, this analyzer can advantageously be a differential refractometer such as disclosed in U. S. Patent 2,724,304, for example. The output signal of analyzer 49 is applied to a recorder-controller 51 which adjusts the setting of valve 47. Controller 51 can be a conventional flow controller, which is reset, to provide a more stable system. In this manner, the overhead product is withdrawn at a rate such that the concentration of a component or of a group of components in the sample stream being analyzed remains at a set value. By maintaining this sample composition constant, the composition of the overhead stream remains substantially constant. Predetermined operating pressures and temperatures are maintained by controllers 36, 37, and 38. Controllers 37 and 38 regulate the amount of cooling of the overhead stream by adjusting the volume of the stream which by-passes condenser 28. Steam is applied to coil 13 in column 10 at a rate which is proportional to the liquid level in accumulator 30. This is accomplished by a liquid level controller 53 adjusting a valve 54 in conduit 12.

An overhead product stream is withdrawn from column 46 through a conduit 55. A kettle product stream is withdrawn from column 46 through a conduit 56 which communicates with a fifth fractionation column 57. An overhead product stream is withdrawn from column 57 through a conduit 58. A kettle product stream is withdrawn from column 57 through a conduit 60 which communicates with outlet conduit 25.

A first flow recorder 61 provides a signal which is representative of the rate of flow through conduit 60. A second flow recorder 62 provides a signal which is representative of the rate of flow through conduit 24. These two signals are applied to a ratio controller 63 which in turn provides an output signal that is representative of the ratio of the two measured flows. Ratio controller 63 can be of the type described in Catalog 2221, The Brown Instrument Company, Philadelphia, Pennsylvania, copyright 1947, for example. The output signal of controller 63 is applied to controller 51 so as to reset its control point and thereby to control valve 47 to bring about the desired sample composition as determined by analyzer 49 and recorded on controller 51. The system is adjusted initially so that a predetermined ratio is to be maintained between the flows through conduits 60 and 24. Controller 63 is thus able to adjust valve 47 to maintain this desired ratio. It should be evident that a partial closing of valve 47 results in a greater flow through kettle product conduit 14 of column 10. A partial opening of valve 47 results in a greater portion of the initial feed stream being removed as overhead product from column 10.

In order to more fully describe the control system of this invention, reference will be made to a specific fluid separation. The compositions in liquid volume percents are as follows:

COLUMN 10

| Component | Feed | Kettle | Overhead |
|---|---|---|---|
| Isopentane | 0.1 | | 0.2 |
| Normal Pentane | 1.8 | | 3.2 |
| Cyclopentane | 2.2 | | 3.9 |
| Isohexanes | 21.9 | 0.2 | 38.0 |
| Normal Hexane | 18.6 | 0.2 | 32.4 |
| Methylcyclopentane | 6.7 | 0.3 | 11.6 |
| Isoheptanes boiling lower than Cyclohexane | 1.7 | 0.3 | 2.9 |
| Cyclohexane | 6.0 | 4.4 | 7.3 |
| Isoheptanes boiling higher than Cyclohexane | 14.2 | 32.2 | 0.5 |
| Normal Heptane | 5.6 | 13.2 | |
| Isooctane | 13.6 | 31.6 | |
| Normal octane and higher boiling | 7.6 | 17.6 | |
| Total | 100.0 | 100.0 | 100.0 |

COLUMN 15

| Component | Feed | Kettle | Overhead |
|---|---|---|---|
| Isohexanes | 0.2 | | 0.7 |
| Normal Hexane | 0.2 | | 0.5 |
| Methylcyclopentane | 0.3 | | 0.7 |
| Isoheptanes boiling lower than Cyclohexane | 0.3 | | 0.7 |
| Cyclohexane | 4.4 | | 12.1 |
| Isoheptanes boiling higher than Cyclohexane | 32.2 | 4.6 | 80.8 |
| Normal Heptane | 13.2 | 18.1 | 4.5 |
| Isooctane | 31.6 | 49.7 | |
| Normal Octane and Higher | 31.6 | 27.6 | |
| Total | 100.0 | 100.0 | 100.0 |

COLUMN 22

| Component | Feed | Kettle | Overhead |
|---|---|---|---|
| Isohexanes | 0.7 | | 5.8 |
| Normal Hexane | 0.5 | | 4.2 |
| Methylcyclopentane | 0.7 | | 5.8 |
| Isoheptanes boiling lower than Cyclohexane | 0.7 | 0.1 | 5.0 |
| Cyclohexane | 12.1 | 3.8 | 71.7 |
| Isoheptanes boiling higher than Cyclohexane | 80.8 | 91.0 | 7.5 |
| Normal Heptane | 4.5 | 5.1 | |
| Total | 100.0 | 100.0 | 100.0 |

COLUMN 46

| Component | Feed | Kettle | Overhead |
|---|---|---|---|
| Isopentane | 0.2 | | 0.6 |
| Normal Pentane | 3.2 | | 9.4 |
| Cyclopentane | 3.9 | | 11.7 |
| Isohexanes | 38.0 | 19.2 | 75.0 |
| Normal Hexane | 32.4 | 47.4 | 3.0 |
| Methylcyclopentane | 11.6 | 17.3 | 0.3 |
| Isoheptanes boiling lower than Cyclohexane | 2.9 | 4.3 | |
| Cyclohexane | 7.3 | 11.0 | |
| Isoheptanes boiling higher than Cyclohexane | 0.5 | 0.8 | |
| Total | 100.0 | 100.0 | 100.0 |

COLUMN 57

| Component | Feed | Kettle | Overhead |
|---|---|---|---|
| Isohexane | 19.2 | 2.9 | 22.0 |
| Normal Hexane | 47.4 | 2.3 | 55.0 |
| Methylcyclopentane | 17.3 | 20.5 | 16.7 |
| Isoheptanes boiling lower than Cyclohexane | 4.3 | 5.8 | 4.0 |
| Cyclohexane | 11.0 | 63.9 | 2.1 |
| Isoheptanes boiling higher than Cyclohexane | 0.8 | 4.6 | 0.2 |
| Total | 100.0 | 100.0 | 100.0 |

The flow rates in gallons per unit time are as follows:

| Column | Feed | Kettle | Overhead |
|---|---|---|---|
| 10 | 6,330 | 2,718 | 3,612 |
| 15 | 2,718 | 1,735 | 983 |
| 22 | 983 | 863 | 120 |
| 46 | 3,612 | 2,398 | 1,214 |
| 57 | 2,398 | 346 | 2,052 |

In this particular separation, cyclohexane is the desired product. The flows through conduits 60 and 24 are maintained in a desired ratio to produce a maximum amount of cyclohexane. If the composition or flow of the input feed to column 10 should vary, the initial separation is adjusted by regulating valve 47 to control the relative overhead and kettle flows from column 10. The particular desired ratio of flows through conduits 60 and 24 depends on the capacities of the several columns and the desired output purity.

Fractionation columns 15, 22, 46, and 57 are illustrated schematically in order to simplify the drawing. The complete temperature, pressure and flow control systems of each of these columns can be substantially identical to the illustrated control system of column 10. A differential refractometer is particularly well suited to control the columns when they are employed to separate the fluid mixture above described. For example, a differential refractometer employed as analyzer 49 can provide a signal which is representative of the concentration of cyclohexane in the upper region of column 10. The feed stream supplied by conduit 48 contains cyclohexane, methylcyclopentane and lighter paraffins. The refractive indices of cyclohexane and methylcyclopentane are substantially higher than the refractive indices of the paraffins.

A measurement of the refractive index of the sample stream thus provides a signal which can accurately be correlated with the concentration of the cyclics present in the upper region of the column. The present invention is not necessarily restricted to the column control being based upon a measurement of refractive index, however. Infrared analyzers, ultraviolet analyzers and mass spectrometers, for example, can be employed to advantage in some systems.

It should be evident that the particular illustrated separation system employing five fractionation columns is not essential to this invention. In some systems, the required separation can be made by the use of only three columns. In systems of this type, the ratio controller provides a signal representative of the ratio of the fluid flows through conduits 56 and 21, for example.

Thus, while the invention has been described in conjunction with a presently preferred embodiment, it should be evident that it is not limited thereto.

What is claimed is:

1. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing at least a portion of said first kettle stream to a third fractionation zone, removing a second overhead stream from said third zone, and controlling the operation of said first zone so that the ratio of the volume of said second kettle stream to the volume of said second overhead stream remains constant.

2. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing at least a portion of said first kettle stream to a third fractionation zone, removing a second overhead stream from said third zone, comparing the flow rates of said second kettle stream and said second overhead stream, and controlling the relative flow rates of said first streams in response to the comparison of flow rates of said second streams so that the ratio of the flow rate of said second kettle stream to the flow rate of said second overhead stream remains constant.

3. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing at least a portion of said first kettle stream to a third fractionation zone, removing a second overhead stream from said third zone, comparing the flow rates of said second kettle stream and said second overhead stream, and controlling the flow rate of said first overhead stream in response to the comparison of flow rates of the second streams so that the ratio of the flow rate of said second kettle stream to the flow rate of said second overhead streams remains constant.

4. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing at least a portion of said first kettle stream to a third fractionation zone, removing a second overhead stream from said third zone, withdrawing a sample stream from said first zone, measuring a property of said sample stream, controlling the flow of said first overhead stream in response to the measurement to tend to maintain the measured property of said sample stream constant, comparing the flow rates of said second kettle stream and said second overhead stream, and further controlling the flow rate of said first overhead stream in response to the comparison of flow rates of the second streams so that the ratio of the flow rate of said second kettle stream to the flow rate of said second overhead stream remains constant.

5. The method of separating from a fluid mixture containingt hree constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing at least a portion of said first kettle stream to a third fractionation zone, removing a second overhead stream from said third zone, withdrawing a sample stream from said first zone, measuring the refractive index of said sample stream, controlling the flow of said first overhead stream in response to the measurement to tend to maintain the measured refractive index constant, comparing the flow rates of said second kettle stream and said second overhead stream, and further controlling the flow rate of said first overhead stream in response to the comparison of flow rates of the second streams so that the ratio of the flow rate of said second kettle stream to the flow rate of said second overhead stream remains constant.

6. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractionation zone, removing a second kettle stream from said second zone, passing said second kettle stream to a third fractional zone, removing a third kettle stream from said third zone, passing said first kettle stream to a fourth fractionation zone, removing a second overhead stream from said fourth zone, passing said second overhead stream to a fifth fractionation zone, removing a third overhead stream from said fifth zone, comparing the flow rates of said third kettle and overhead streams, and controlling the relative flow rates of said first streams in response to the comparison of flow rates of the third streams so that the ratio of the flow rate of said third kettle stream to the flow rate of said third overhead stream remains constant.

7. The method of separating from a fluid mixture containing three constituents having different boiling points a fluid containing a greater percent of the intermediately boiling constituent than does the mixture which comprises passing such a fluid mixture to a first fractionation zone, removing first overhead and kettle streams from said first zone, each of said first streams containing a portion of the intermediately boiling constituent, passing at least a portion of said first overhead stream to a second fractonation zone, removing a second kettle stream from said second zone, passing said second kettle stream to a third fractionation zone, removing a third kettle stream from said third zone, passing said first kettle stream to a fourth fractionation zone, removing a second overhead stream from said fourth zone, passing said second overhead stream to a fifth fractionation zone, removing a third overhead stream from said fifth zone, withdrawing a sample stream from said first zone, measuring a property of said sample stream, controlling the flow of said first overhead stream in response to the measurement to tend to maintain the measured property of said sample stream constant, comparing the flow rates of said third streams, and further controlling the flow rate of said first overhead stream in response to the comparison of flow rates of the third streams so that the ratio of the flow rate of said third kettle stream to the flow rate of said third overhead stream remains constant.

8. Apparatus for separating from a fluid mixture comprising three constituents having different boiling points a fluid containing a greater percent of the intermediately boiling constituent than does the mixture comprising first, second and third fractionation columns, means to direct the fluid mixture to be separated to said first column, first means to remove an overhead stream from said first column and to direct at least a portion thereof to said second column, second means to remove a kettle stream from said second column, third means to remove a kettle stream from said first column and to direct at least a portion thereof to said third column, fourth means to remove an overhead stream from said third column, means to compare the flow rate of the kettle stream from said second column with the flow rate of the overhead stream from said third column, and means responsive to said means to compare to regulate the relative flows of the kettle and overhead streams from said first column.

9. Apparatus for separating from a fluid mixture containing three constituents having different boiling points a fluid containing a greater percent of the intermediately boiling constituent than does the mixture comprising first, second and third fractionation columns, means to direct the fluid mixture to be separated to said first column, first means to remove an overhead stream from said first column and to direct at least a portion thereof to said second column, second means to remove a kettle stream from said second column, third means to remove a kettle stream from said first column and to direct at least a portion thereof to said third column, fourth means to remove an overhead stream from said third column, an analyzer, conduit means communicating between said analyzer and a region in said first column to direct a sample stream to said analyzer, means responsive to the output of said analyzer to regulate the relative flows of the kettle and overhead streams from said first column, means to compare the flow rate of the kettle stream from said second column with the flow rate of the overhead stream from said third column, and means responsive to said means to compare to reset the control point of the means responsive to the output of said analyzer.

10. The combination in accordance with claim 9 wherein said means responsive to the output of said analyzer regulates the overhead stream from said first column.

11. The combination in accordance with claim 9 wherein said analyzer is a refractometer.

12. Apparatus for separating from a fluid mixture containing three constituents having different boiling points a fluid containing a greater percent of the intermediately boiling constituent than does the mixture comprising first, second, third, fourth and fifth fractionation columns, means to direct the fluid mixture to be separated to said first column, first conduit means to direct an overhead stream from said first column to said second column, second conduit means to direct a kettle stream from said second column to said third column, third conduit means to remove a kettle stream from said third column, fourth conduit means to direct a kettle stream from said first column to said fourth column, fifth conduit means to direct an overhead stream from said fourth column to said fifth column, sixth conduit means to remove an overhead stream from said fifth column, means to compare the flow rates through said third and sixth conduit means, and means responsive to said means to compare to regulate the relative flow rates through said first and fourth conduit means.

13. Apparatus for separating from a fluid mixture containing three constituents having different boiling points a fluid containing a greater percent of the intermediately boiling constituent than does the mixture comprising, first, second, third, fourth and fifth fractionation columns, means to direct the fluid mixture to be separated to said first column, first conduit means to direct an overhead stream from said first column to said second column, second conduit means to direct a kettle stream from said second column to said third column, third conduit means to remove a kettle stream from said third column, fourth conduit means to direct a kettle stream from said first column to said fourth column, fifth conduit means to direct an overhead stream from said fourth column to said fifth column, sixth conduit means to remove an overhead stream from said fifth column, an analyzer, conduit means communicating between said analyzer and a region in said first column to direct a sample stream to said analyzer, means responsive to the output of said analyzer to regulate the relative flow rates through said first and fourth conduit means, means to compare the flow rates through said third and sixth conduit means, and means responsive to said means to compare to reset the control point of the means responsive to the output of said analyzer.

14. Apparatus for separating from a fluid mixture containing three constituents having different boiling points a fluid containing a greater percent of the intermediately boiling constituent than does the mixture comprising first, second and third fractionation columns, means to direct the fluid mixture to be separated to said first column, first means to remove an overhead stream from said first column and to direct at least a portion thereof to said second column, second means to remove a kettle stream from said second column, third means to remove a kettle stream from said first column and to direct at least a portion thereof to said third column, fourth means to remove an overhead stream from said third column, an analyzer, conduit means communicating between said analyzer and a region in said first column to direct a sample stream to said analyzer, a valve in said first means to remove, means to control said valve responsive to the output of said analyzer, a ratio controller that includes means for comparing the flow in said second means with the flow in said fourth means, and means to reset said means to control in response to said ratio controller.

References Cited in the file of this patent
UNITED STATES PATENTS

| | | |
|---|---|---|
| 2,246,934 | Denney | June 24, 1941 |
| 2,614,969 | Morrell et al. | Oct. 21, 1952 |
| 2,750,511 | Miller | June 12, 1956 |

UNITED STATES PATENT OFFICE
CERTIFICATE OF CORRECTION

Patent No. 2,868,701 January 13, 1959

Donald E. Berger

It is hereby certified that error appears in the printed specification of the above numbered patent requiring correction and that the said Letters Patent should read as corrected below.

Column 5, line 58, for "tainingt hree" read -- taining three --; column 6, line 17, for "fractional" read -- fractionation --.

Signed and sealed this 9th day of June 1959.

(SEAL)
Attest:

KARL H. AXLINE
Attesting Officer

ROBERT C. WATSON
Commissioner of Patents